United States Patent
Nagaraj et al.

(10) Patent No.: US 7,666,515 B2
(45) Date of Patent: Feb. 23, 2010

(54) TURBINE COMPONENT OTHER THAN AIRFOIL HAVING CERAMIC CORROSION RESISTANT COATING AND METHODS FOR MAKING SAME

(75) Inventors: Bangalore Aswatha Nagaraj, West Chester, OH (US); Brian Thomas Hazel, West Chester, OH (US); Jeffrey Allan Pfaendtner, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 11/094,351

(22) Filed: Mar. 31, 2005

(65) Prior Publication Data

US 2006/0222884 A1    Oct. 5, 2006

(51) Int. Cl.
B32B 9/00 (2006.01)
F01D 5/00 (2006.01)

(52) U.S. Cl. .................. 428/469; 428/472; 428/702; 416/241 B

(58) Field of Classification Search .............. None
See application file for complete search history.

(56) References Cited

U.S. PATENT DOCUMENTS

| | | | |
|---|---|---|---|
| 3,248,249 A | 4/1966 | Collins | |
| 3,248,250 A | 4/1966 | Collins | |
| 3,248,251 A | 4/1966 | Allen | |
| 3,540,878 A | 11/1970 | Levine et al. | |
| 3,598,638 A | 8/1971 | Levine | |
| 3,667,985 A | 6/1972 | Levine et al. | |
| 4,353,780 A | 10/1982 | Fishter et al. | |
| 4,411,730 A | 10/1983 | Fishter et al. | |
| 4,563,239 A | 1/1986 | Adinolfi et al. | |
| 4,741,286 A | 5/1988 | Itoh et al. | |
| 4,957,567 A | 9/1990 | Krueger et al. | |
| 5,332,598 A | 7/1994 | Kawasaki et al. | |
| 5,368,888 A | 11/1994 | Rigney | |
| 5,660,885 A | 8/1997 | Hasz et al. | |
| 5,723,078 A | 3/1998 | Nagaraj et al. | |
| 6,057,047 A * | 5/2000 | Maloney | 428/623 |
| 6,146,692 A * | 11/2000 | Sangeeta et al. | 427/142 |
| 6,270,318 B1 | 8/2001 | Shah et al. | |
| 6,283,715 B1 | 9/2001 | Nagaraj et al. | |
| 6,521,175 B1 | 2/2003 | Mourer et al. | |
| 6,616,978 B1 | 9/2003 | Weimer et al. | |
| 6,641,907 B1 | 11/2003 | Merrill et al. | |
| 6,682,821 B2 | 1/2004 | Fukudome et al. | |
| 6,869,703 B1 | 3/2005 | Spitsberg et al. | |
| 6,887,595 B1 | 5/2005 | Darolia et al. | |
| 2003/0049470 A1 | 3/2003 | Maloney | |
| 2003/0138641 A1 | 7/2003 | Fukudome et al. | |
| 2003/0138658 A1 | 7/2003 | Taylor et al. | |
| 2004/0001965 A1 | 1/2004 | Zhao et al. | |
| 2004/0013802 A1 | 2/2004 | Ackerman et al. | |

(Continued)

*Primary Examiner*—Timothy M Speer
(74) *Attorney, Agent, or Firm*—William Scott Andes

(57) ABSTRACT

An article comprising a turbine component other than an airfoil having a metal substrate and a ceramic corrosion resistant coating overlaying the metal substrate. This coating has a thickness up to about one micrometer and consists of a ceramic composition that comprises a ceramic metal oxide selected from the group consisting of zirconia, hafnia and mixtures thereof. This coating can be formed by alternative methods to have different microstructures, including a dense matrix or a strain-tolerant columnar grain structure.

14 Claims, 2 Drawing Sheets

U.S. PATENT DOCUMENTS

| | | |
|---|---|---|
| 2004/0081767 A1 | 4/2004 | Pfaendtner et al. |
| 2004/0115406 A1 | 6/2004 | Nagaraj et al. |
| 2004/0115469 A1 | 6/2004 | Nagaraj et al. |
| 2004/0115470 A1 | 6/2004 | Ackerman et al. |
| 2005/0008780 A1 | 1/2005 | Ackerman et al. |
| 2005/0031794 A1 | 2/2005 | Darolia et al. |

* cited by examiner

TURBINE COMPONENT OTHER THAN AIRFOIL HAVING CERAMIC CORROSION RESISTANT COATING AND METHODS FOR MAKING SAME

BACKGROUND OF THE INVENTION

This invention broadly relates to turbine components other than airfoils, such as turbine disks, turbine seals and other static components, having thereon a ceramic corrosion resistant coating. This invention further broadly relates to methods for forming such coatings on the turbine component.

In an aircraft gas turbine engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against the airfoil section of the turbine blades, which turns the shaft and provides power to the compressor. The hot exhaust gases flow from the back of the engine, driving it and the aircraft forward. The hotter the combustion and exhaust gases, the more efficient is the operation of the jet engine. Thus, there is incentive to raise the combustion gas temperature.

The compressors and turbines of the turbine engine can comprise turbine disks (sometimes termed "turbine rotors") or turbine shafts, as well as a number of blades mounted to the turbine disks/shafts and extending radially outwardly therefrom into the gas flow path. Also included in the turbine engine are rotating, as well as static, seal elements that channel the airflow used for cooling certain components such as turbine blades and vanes. As the maximum operating temperature of the turbine engine increases, the turbine disks/shafts and seal elements are subjected to higher temperatures. As a result, oxidation and corrosion of the disks/shafts and seal elements have become of greater concern.

Metal salts such as alkaline sulfate, sulfites, chlorides, carbonates, oxides, and other corrodant salt deposits resulting from ingested dirt, fly ash, concrete dust, sand, sea salt, etc., are a major source of the corrosion, but other elements in the aggressive bleed gas environment (e.g., air extracted from the compressor to cool hotter components in the engine) can also accelerate the corrosion. Alkaline sulfate corrosion in the temperature range and atmospheric region of interest results in pitting of the turbine disk/shaft and seal element substrate at temperatures typically starting around 1200° F. (649° C.). This pitting corrosion has been shown to occur on critical turbine disk/shaft and seal elements. The oxidation and corrosion damage can lead to premature removal and replacement of the disks/shafts and seal elements unless the damage is reduced or repaired.

Turbine disks/shafts and seal elements for use at the highest operating temperatures are typically made of nickel-base superalloys selected for good elevated temperature toughness and fatigue resistance. These superalloys have resistance to oxidation and corrosion damage, but that resistance is not sufficient to protect them at sustained operating temperatures now being reached in gas turbine engines. Disks and other rotor components made from newer generation alloys can also contain lower levels of aluminum and/or chromium, and can therefore be more susceptible to corrosion attack.

Corrosion resistant diffusion coatings can also be formed from aluminum or chromium, or from the respective oxides (i.e., alumina or chromia). See, for example, commonly assigned U.S. Pat. No. 5,368,888 (Rigney), issued Nov. 29, 1994 (aluminide diffusion coating); and commonly assigned U.S. Pat. No. 6,283,715 (Nagaraj et al), issued Sep. 4, 2001 (chromium diffusion coating). A number of corrosion-resistant coatings have also been considered for use on turbine disk/shaft and seal elements. See, for example, U.S. Patent Application No. 2004/0013802 (Ackerman et al), published Jan. 22, 2004, which discloses metal-organic chemical vapor deposition (MOCVD) of aluminum, silicon, tantalum, titanium or chromium oxide on turbine disks and seal elements to provide a protective coating. These prior corrosion resistant coatings can have a number of disadvantages, including: (1) possibly adversely affecting the fatigue life of the turbine disks/shafts and seal elements because these prior coatings diffuse into the underlying metal substrate; (2) coefficient of thermal expansion (CTE) mismatches between the coating and the underlying metal substrate that can make the coating more prone to spalling; and (3) more complicated and expensive processes (e.g., chemical vapor deposition) for depositing the corrosion resistant coating on the metal substrate.

Accordingly, there is still a need for coatings for turbine disks, turbine shafts, turbine seal elements and other non-airfoil turbine components that: (1) provide corrosion resistance, especially at higher or elevated temperatures; (2) without affecting other mechanical properties of the underlying metal substrate or potentially causing other undesired effects such as spalling; and (3) can be formed by relatively uncomplicated and inexpensive methods.

BRIEF DESCRIPTION OF THE INVENTION

An embodiment of this invention broadly relates to an article comprising a turbine component other than an airfoil having a metal substrate and a ceramic corrosion resistant coating overlaying the metal substrate, wherein the ceramic corrosion resistant coating has a thickness up to about 5 mils (127 microns) and comprises a ceramic metal oxide selected from the group consisting of zirconia, hafnia and mixtures thereof.

Another embodiment of this invention broadly relates to a method for forming this ceramic corrosion resistant coating on the underlying metal substrate of the turbine component. One embodiment of this method comprises the following steps:
  (a) providing a turbine component other than an airfoil comprising a metal substrate;
  (b) providing a gel-forming solution comprising a ceramic metal oxide precursor;
  (c) heating the gel-forming solution to a first preselected temperature for a first preselected time to form a gel;
  (d) depositing the gel on the metal substrate; and
  (e) firing the deposited gel at a second preselected temperature above the first preselected temperature to form a ceramic corrosion resistant coating comprising a ceramic metal oxide, wherein the ceramic metal oxide is selected from the group consisting of zirconia, hafnia and mixtures thereof.

An alternative embodiment of this method for forming this coating comprises the following steps:
  (a) providing a turbine component other than an airfoil comprising a metal substrate; and
  (b) depositing a ceramic composition comprising a ceramic metal oxide on the metal substrate by physical vapor deposition to form a ceramic corrosion resistant coating comprising the ceramic metal oxide and having a strain-tolerant columnar structure, wherein the ceramic metal oxide is selected from the group consisting of zirconia, hafnia and mixtures thereof.

Another alternative embodiment of this method for forming this coating comprises the following steps:

(a) providing a turbine component other than an airfoil comprising a metal substrate; and
(b) thermal spraying a ceramic composition comprising a ceramic metal oxide on the metal substrate to form the ceramic corrosion resistant coating comprising the ceramic metal oxide, wherein the ceramic metal oxide is selected from the group consisting of zirconia, hafnia and mixtures thereof.

The ceramic corrosion resistant coating of this invention provides a number of significant benefits and advantages. Because the ceramic corrosion resistant coating comprises a zirconia and/or hafnia as the ceramic metal oxide, it does not diffuse into the underlying metal substrate. As a result, the ceramic corrosion resistant coating does not adversely affect the fatigue properties of the coated turbine disk/shafts, seal elements and other turbine components.

Because of the greater coefficient of thermal expansion match between the ceramic metal oxide and the underlying metal substrate, the ceramic corrosion resistant coating of this invention provides greater adherence to the substrate and thus greater resistance to spalling. This increased adherence will also further improve the fatigue properties of the coated turbine disks/shafts, seal elements and other turbine components by resisting propagation of cracks though the thickness of the coating into the metal substrate.

These ceramic corrosion resistant coating can be formed by embodiments of the method of this invention that are relatively uncomplicated and inexpensive. In addition, the ceramic corrosion resistant coating can be formed by embodiments of the methods of this invention as a relatively thin layer on the metal substrate.

DETAILED DESCRIPTION OF THE INVENTION

Figure 1:
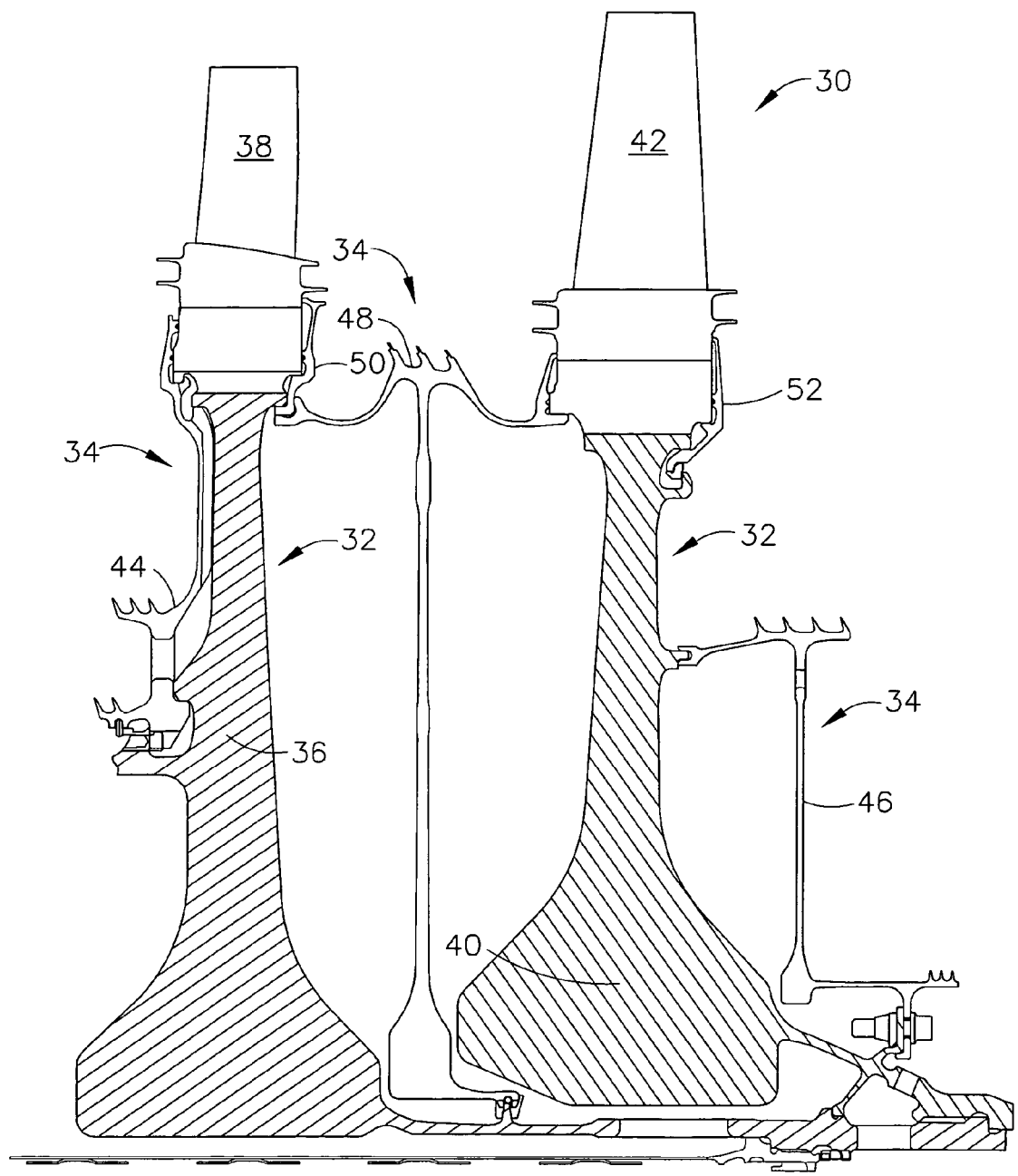
FIG. 1 is a schematic sectional view of a portion of the turbine section of a gas turbine engine.

As used herein, the term "ceramic metal oxide" refers to zirconia, hafnia or combinations of zirconia and hafnia (i.e., mixtures thereof). These ceramic metal oxides were previously used in thermal barrier coatings that are capable of reducing heat flow to the underlying metal substrate of the article, i.e., forming a thermal barrier, and which have a melting point that is typically at least about 2600° F. (1426° C.), and more typically in the range of from about from about 3450° to about 4980° F. (from about 1900° to about 2750° C.). The ceramic metal oxide can comprise 100 mole % zirconia, 100 mole % hafnia, or any percentage combination of zirconia and hafnia that is desired. Typically, the ceramic metal oxide comprises from about 85 to 100 mole % zirconia and from 0 to about 15 mole % hafnia, more typically from about 95 to 100 mole % zirconia and from 0 to about 5 mole % hafnia.

As used herein, the term "ceramic metal oxide precursor" refers to any composition, compound, molecule, etc., that is converted into or forms the ceramic metal oxide, for example, from the respective ceramic metal hydroxide, at any point up to and including the formation of the ceramic corrosion resistant coating.

As used herein, the term "ceramic corrosion resistant coating" refers to coatings of this invention that provide resistance against corrosion caused by various corrodants, including metal (e.g., alkaline) sulfates, sulfites, chlorides, carbonates, oxides, and other corrodant salt deposits resulting from ingested dirt, fly ash, concrete dust, sand, sea salt, etc., at temperatures typically of at least about 1000° F. (538° C.), more typically at least about 1200° F. (649° C.), and which comprise the ceramic metal oxide. The ceramic corrosion resistant coatings of this invention usually comprise at least about 60 mole % ceramic metal oxide, typically from about 60 to about 98 mole % ceramic metal oxide, and more typically from about 94 to about 97 mole % ceramic metal oxide. The ceramic corrosion resistant coatings of this invention further typically comprise a stabilizing amount of a stabilizer metal oxide for the ceramic metal oxide. These stabilizer metal oxides can be selected from the group consisting of yttria, calcia, scandia, magnesia, india, gadolinia, neodymia, samaria, dysprosia, erbia, ytterbia, europia, praseodymia, lanthana, tantala, etc., and mixtures thereof. The particular amount of this stabilizer metal oxide that is "stabilizing" will depend on a variety of factors, including the stabilizer metal oxide used, the ceramic metal oxide used, etc. Typically, the stabilizer metal oxide comprises from about 2 about 40 mole %, more typically from about 3 to about 6 mole %, of the ceramic corrosion resistant coating. The ceramic corrosion resistant coatings used herein typically comprise yttria as the stabilizer metal oxide. See, for example, Kirk-Othmer's Encyclopedia of Chemical Technology, 3rd Ed., Vol. 24, pp. 882-883 (1984) for a description of suitable yttria-stabilized zirconia-containing ceramic compositions that can be used in the ceramic corrosion resistant coatings of this invention.

As used herein, the term "ceramic composition" refers to compositions used to form the ceramic corrosion resistant coatings of this invention, and which comprise the ceramic metal oxide, optionally but typically the stabilizer metal oxide, etc.

As used herein, the term "turbine component other than an airfoil" refers to those turbine components that are not airfoils (e.g., blades, vanes, etc.) that are formed from metals or metal alloys, and include turbine disks (also referred to sometimes as "turbine rotors"), turbine shafts, turbine seal elements that are either rotating or static, including forward, interstage and aft turbine seals, turbine blade retainers, other static turbine components, etc. The turbine component for which the ceramic corrosion resistant coatings of this invention are particularly advantageous are those that experience a service operating temperature of at least about 1000° F. (538° C.), more typically at least about 1200° F. (649° C.), and typically in the range of from about 1000° to about 1600° F. (from about 538° to about 871° C.). These components are usually exposed to turbine bleed air (e.g., air extracted from the compressor to cool hotter components in the engine) having ingested corrosive components, typically metal sulfates, sulfites, chlorides, carbonates, etc., that can deposit on the surface of the component. The ceramic corrosion resistant coatings of this invention are particularly useful when formed on all or selected portions of the surfaces of the component, such as the surfaces of turbine disks/shafts and turbine seal elements. For example, the mid-to-outer portion of the hub of a turbine disk can have the ceramic corrosion resistant coating of this invention, while the bore region, inner portion of the hub, and blade slots may or may not have this coating. In addition, the contact points or mating surfaces between these components such as the disk post pressure faces (i.e., the mating surface between the disk post and the turbine blade dovetail), as well as the contact points between the disks and seals, can be void or absent of the ceramic corrosion resistant coating so as to retain desired or specified as produced dimensions.

As used herein, the term "comprising" means various coatings, compositions, metal oxides, components, layers, steps, etc., can be conjointly employed in the present invention. Accordingly, the term "comprising" encompasses the more restrictive terms "consisting essentially of" and "consisting of."

All amounts, parts, ratios and percentages used herein are by mole % unless otherwise specified.

The various embodiments of the turbine components having the ceramic corrosion resistant coating of this invention are further illustrated by reference to the drawings as described hereafter. Referring to FIG. 1, a turbine engine rotor component 30 is provided that can be of any operable type, for example, a turbine disk 32 or a turbine seal element 34. FIG. 1 schematically illustrates a stage 1 turbine disk 36, a stage I turbine blade 38 mounted to the turbine disk 36, a stage 2 turbine disk 40, a stage 2 turbine blade 42 mounted to the turbine disk 40, a forward turbine seal 44 that also functions as a forward blade retainer for blade 38, an aft turbine seal 46, and an interstage turbine seal 48 that also functions as a forward blade retainer for blade 42, an aft blade retainer 50 for blade 38 that is held in place by seal 48, and an aft blade retainer 52 for blade 42. Any or all of these turbine disks 32 (e.g., stage 1 turbine disk 36 and a stage 2 turbine disk 40), turbine seal elements 34 (e.g., forward turbine seal 44, aft turbine seal 46, and interstage turbine seal 48) and/or blade retainers 50/52, or any selected portion thereof, can be provided with the ceramic corrosion resistant coating of this invention, depending upon whether corrosion is expected or observed.

Figure 2:
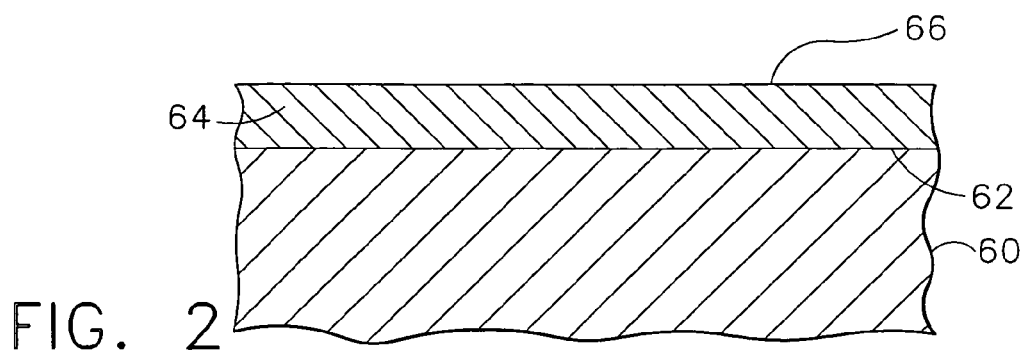
FIG. 2 is a sectional view of an embodiment of the ceramic corrosion resistant coating of this invention deposited on the metal substrate of a turbine rotor component.

Referring to FIG. 2, the metal substrate 60 of the turbine engine rotor component 30 can comprise any of a variety of metals, or more typically metal alloys, including those based on nickel, cobalt and/or iron alloys. Substrate 60 typically comprises a superalloy based on nickel, cobalt and/or iron. Such superalloys are disclosed in various references, such as, for example, commonly assigned U.S. Pat. No. 4,957,567 (Krueger et al), issued Sep. 18, 1990, and U.S. Pat. No. 6,521,175 (Mourer et al), issued Feb. 18, 2003, the relevant portions of which are incorporated by reference. Superalloys are also generally described in Kirk-Othmer's Encyclopedia of Chemical Technology, 3rd Ed., Vol. 12, pp. 417-479 (1980), and Vol. 15, pp. 787-800 (1981). Illustrative nickel-based superalloys are designated by the trade names Inconel®, Nimonic®, René® (e.g., René® 88, René® 104, René N5 alloys), and Udimet®.

Substrate 60 more typically comprises a nickel-based alloy, and particularly a nickel-based superalloy, that has more nickel than any other element. The nickel-based superalloy can be strengthened by the precipitation of gamma prime or a related phase. A nickel-based superalloy for which the ceramic corrosion resistant coating of this invention is particularly useful is available by the trade name René 88, which has a nominal composition, by weight of 13% cobalt, 16% chromium, 4% molybdenum, 3.7% titanium, 2.1% aluminum, 4% tungsten, 0.70% niobium, 0.015% boron, 0.03% zirconium, and 0.03 percent carbon, with the balance nickel and minor impurities.

In forming the ceramic corrosion resistant coating 64 of this invention on the surface 62 of metal substrate 60, surface 62 is typically pretreated mechanically, chemically or both to make the surface more receptive for coating 64. Suitable pretreatment methods include grit blasting, with or without masking of surfaces that are not to be subjected to grit blasting (see U.S. Pat. No. 5,723,078 to Niagara et al, issued Mar. 3, 1998, especially col. 4, lines 46-66, which is incorporated by reference), micromachining, laser etching (see U.S. Pat. No. 5,723,078 to Nagaraj et al, issued Mar. 3, 1998, especially col. 4, line 67 to col. 5, line 3 and 14-17, which is incorporated by reference), treatment with chemical etchants such as those containing hydrochloric acid, hydrofluoric acid, nitric acid, ammonium bifluorides and mixtures thereof (see, for example, U.S. Pat. No. 5,723,078 to Nagaraj et al, issued Mar. 3, 1998, especially col. 5, lines 3-10; U.S. Pat. No. 4,563,239 to Adinolfi et al, issued Jan. 7, 1986, especially col. 2, line 67 to col. 3, line 7; U.S. Pat. No. 4,353,780 to Fishter et al, issued Oct. 12, 1982, especially col. 1, lines 50-58; and U.S. Pat. No. 4,411,730 to Fishter et al, issued Oct. 25, 1983, especially col. 2, lines 40-51, all of which are incorporated by reference), treatment with water under pressure (i.e., water jet treatment), with or without loading with abrasive particles, as well as various combinations of these methods. Typically, the surface 62 of metal substrate 60 is pretreated by grit blasting where surface 62 is subjected to the abrasive action of silicon carbide particles, steel particles, alumina particles or other types of abrasive particles. These particles used in grit blasting are typically alumina particles and typically have a particle size of from about 600 to about 35 mesh (from about 25 to about 500 micrometers), more typically from about 400 to about 300 mesh (from about 38 to about 50 micrometers).

An embodiment of the method of this invention for forming ceramic corrosion resistant coating 64 on metal substrate 60 is by use of a sol-gel process. See commonly assigned U.S. Patent Application No. 2004/0081767 (Pfaendtner et al), published Apr. 29, 2004, which is incorporated by reference. Sol-gel processing is a chemical solution method to produce a ceramic oxide (e.g., zirconia). A chemical gel-forming solution which typically comprises an alkoxide precursor or a metal salt is combined with ceramic metal oxide precursor materials, as well as any stabilizer metal oxide precursor materials, etc. A gel is formed as the gel-forming solution is heated to slightly dry it at a first preselected temperature for a first preselected time. The gel is then applied over the surface 62 of metal substrate 60. Proper application of the ceramic metal oxide precursor materials and proper drying produce a continuous film over the surface 62. The sol-gel can be applied to surface 62 of substrate 60 by any convenient technique. For example, the sol-gel can be applied by spraying at least one thin layer, e.g., a single thin layer, or more typically a plurality of thin layers to build up a film to the desired thickness for coating 64. The gel is then fired at a second elevated preselected temperature above the first elevated temperature for a second preselected time to form coating 64. The ceramic corrosion resistant coating 64 comprises a dense matrix that has a thickness of up to about 5 mils (127 microns) and typically from about 0.01 to about 1 mils (from about 0.2 to about 25 microns), more typically from about 0.04 to about 0.5 mils (from about 1 to about 13 microns). Optionally, inert oxide filler particles can be added to the sol-gel solution to enable a greater per-layer thickness to be applied to the substrate.

An alternative method for forming ceramic corrosion resistant coating 64 is by physical vapor deposition (PVD), such as electron beam PVD (EB-PVD), filtered arc deposition, or by sputtering. Suitable sputtering techniques for use herein include but are not limited to direct current diode sputtering, radio frequency sputtering, ion beam sputtering, reactive sputtering, magnetron sputtering and steered arc sputtering. PVD techniques can form ceramic corrosion resistant coatings 64 having strain resistant or tolerant microstructures such as vertical microcracked structures. EB-PVD techniques can form columnar structures that are highly strain resistant to further increase the coating adherence. Although these strain resistant or tolerant structures have direct paths between the coating surface 66 and the substrate 60, the paths are sufficiently narrow that the partially molten or highly viscous corrodant salts do not infiltrate or minimally infiltrate the cracks of the vertically microcracked structures or column gaps of the columnar structures.

Other suitable alternative methods for forming these ceramic corrosion resistant coating include thermal spray, aerosol spray, chemical vapor deposition (CVD) and pack cementation. As used herein, the term "thermal spray" refers to any method for spraying, applying or otherwise depositing the ceramic composition that involves heating and typically at least partial or complete thermal melting of the overlay coating material and depositing of the heated/melted material, typically by entrainment in a heated gas stream, onto the metal substrate to be coated. Suitable thermal spray deposition techniques include plasma spray, such as air plasma spray (APS) and vacuum plasma spray (VPS), high velocity oxy-fuel (HVOF) spray, detonation spray, wire spray, etc., as well as combinations of these techniques. A particularly suitable thermal spray deposition technique for use herein is plasma spray. Suitable plasma spray techniques are well known to those skilled in the art. See, for example, Kirk-Othmer Encyclopedia of Chemical Technology, 3rd Ed., Vol. 15, page 255, and references noted therein, as well as U.S. Pat. No. 5,332,598 (Kawasaki et al), issued Jul. 26, 1994; U.S. Pat. No. 5,047,612 (Savkar et al) issued Sep. 10, 1991; and U.S. Pat. No. 4,741,286 (Itoh et al), issued May 3, 1998 (herein incorporated by reference) which are instructive in regard to various aspects of plasma spraying suitable for use herein.

Suitable methods for carrying out chemical vapor deposition and/or pack cementation are disclosed in, for example, commonly assigned U.S. Pat. No. 3,540,878 (Levine et al), issued Nov. 17, 1970; commonly assigned U.S. Pat. No. 3,598,638 (Levine), issued Aug. 10, 1971; commonly assigned U.S. Pat. No. 3,667,985 (Levine et al), issued Jun. 6, 1972, the relevant disclosures of which are incorporated by reference. Metal-organic chemical vapor phase deposition (MOCVD) processes can also be used herein. See commonly assigned U.S. Patent Application No. 2004/0013802 (Ackerman et al), published Jan. 22, 2004, the relevant disclosures of which are incorporated by reference.

Figure 3:
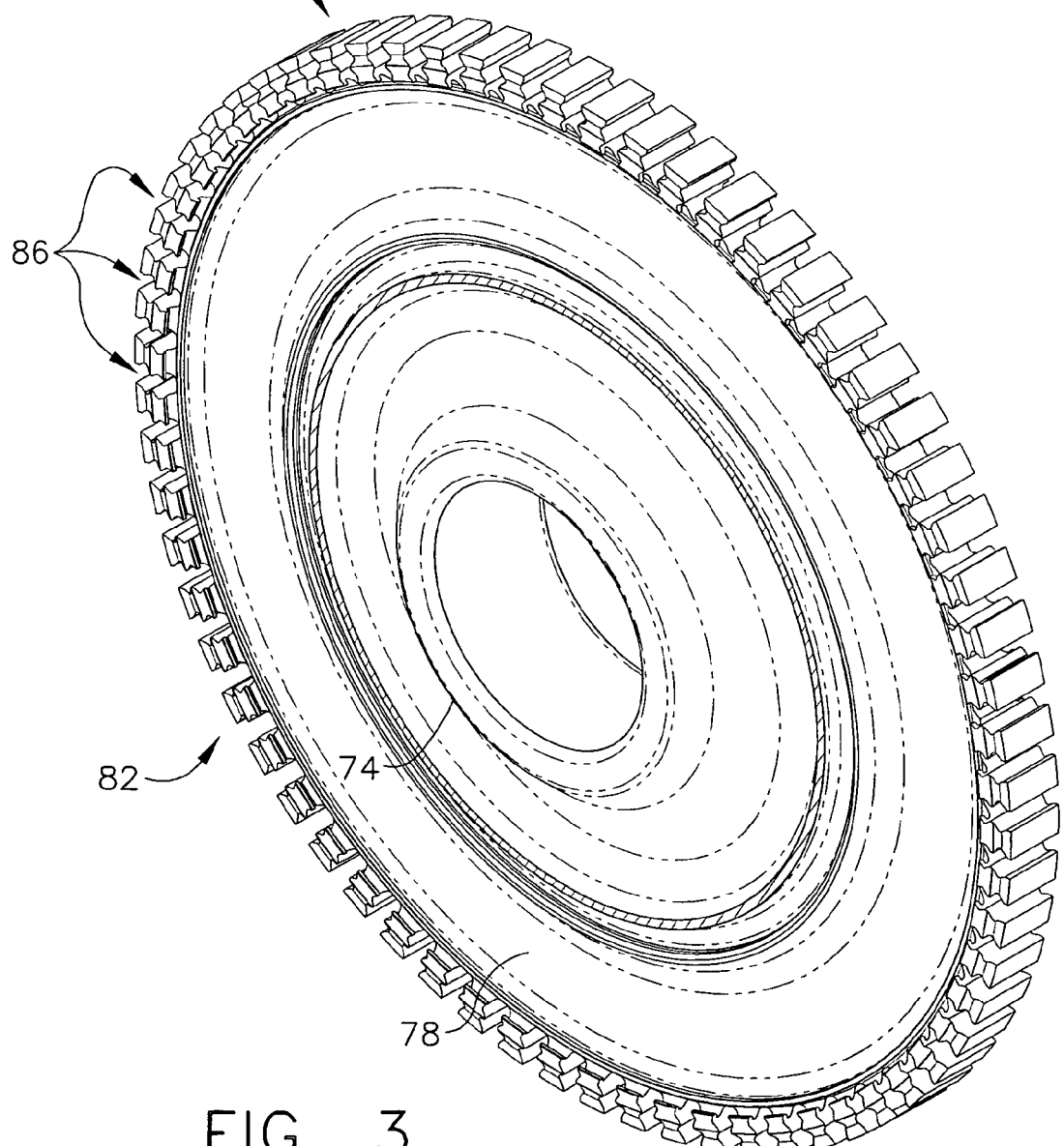
FIG. 3 is a frontal view of a turbine disk showing where the ceramic corrosion resistant coating of this invention is desirably located.

As illustrated in FIG. 3, typically only a portion of the surface of these turbine disks/shafts, seals and/or blade retainers are provided with the ceramic corrosion resistant coating 64 of this invention. FIG. 3 shows a turbine disk 32 having an inner generally circular hub portion indicated as 74 and an outer generally circular perimeter or diameter indicated as 78, and a periphery indicated as 82 that is provided with a plurality of circumferentially spaced slots indicated as 86 for receiving the root portion of turbine blades such as 38, 42. While the ceramic corrosion resistant coating 64 can be applied to the entire surface of disk 70, it is typically needed only on the surface of outer diameter 78.

While the above embodiments have been described in the context of coating turbine engine disks, this invention can be used to form a ceramic corrosion resistant coating 64, as described above, on the surfaces of various turbine engine rotor components, including compressor disks, seals, and shafts, which can then be exposed to corrosive elements at elevated temperatures. The ceramic corrosion resistant coatings of this invention can also be applied during original manufacture of the component (i.e., an OEM component), after the component has been in operation for a period of time, after other coatings have been removed from the component (e.g., a repair situation), while the component is assembled or after the component is disassembled, etc.

The following example illustrates an embodiment for forming the ceramic corrosion coating of this invention on a metal substrate by sol-gel processing and the benefits obtained thereby:

A one inch round sample of René N5 alloy is coated with an approximately 5 micron layer of a 7 wt. % yttria stabilized zirconia deposited from a sol gel. A sulfate containing corrodant is applied to the surface of the coating and run through a 2 hour cycle at 1300° F. (704° C.). The first hour of the 2 hour cycle uses a reducing atmosphere to try to cause a reaction between the corrodant and the surface of the coated sample, while the second hour uses air to cause corrosion scale growth. The corrodant is removed by water washing and coated sample is then inspected for damage. This corrosion application, thermal exposure, cleaning and inspection cycle is repeated until the coated sample shows signs of damage. After 8 cycles no appreciable damage is noted on the coated sample. After 10 cycles, the coating is still adherent to the alloy, but discoloration is noted and the coated sample is cross-sectioned for evaluation. After cross-sectioning, a corrosion production layer approximately 10 microns thick is found below the coating. For comparison, this is representative of a bare alloy sample (i.e., with no coating) after approximately 2 cycles of such testing.

While specific embodiments of this invention have been described, it will be apparent to those skilled in the art that various modifications thereto can be made without departing from the spirit and scope of this invention as defined in the appended claims.

What is claimed is:

1. An article comprising a turbine component other than a turbine airfoil, the article having a metal substrate with an outer surface and a single-layer ceramic corrosion resistant coating on and contacting the outer surface of the metal substrate and having a surface that defines an external surface of the turbine component, wherein the ceramic corrosion resistant coating has a total thickness between the outer surface of the metal substrate and the external surface defined by the coating of up to 25 micrometers and the ceramic corrosion resistant coating consists of a ceramic composition that comprises a ceramic metal oxide selected from the group consisting of zirconia, hafnia and mixtures thereof.

2. The article of claim 1 wherein the turbine component is a compressor or turbine disk.

3. The article of claim 1 wherein the turbine component is a compressor or turbine seal element.

4. The article of claim 1 wherein the ceramic composition comprises from about 60 to about 98 mole % of the ceramic metal oxide and from about 2 to about 40 mole % of a stabilizer metal oxide.

5. The article of claim 4 wherein the ceramic metal oxide comprises from about 85 to 100 mole % zirconia and from 0 to about 15 mole % hafnia.

6. The article of claim 5 wherein the ceramic metal oxide comprises from about 95 to 100 mole % zirconia and from 0 to about 5 mole % hafnia.

7. The article of claim 4 wherein the stabilizer metal oxide is selected from the group consisting of yttria, calcia, scandia, magnesia, india, gadolinia, neodymia, samaria, dysprosia, erbia, ytterbia, europia, praseodymia, lanthana, tantala, and mixtures thereof.

8. The article of claim 7 wherein the ceramic composition comprises from about 94 to about 97 mole % of the ceramic metal oxide and from about 3 to about 6 mole % yttria.

9. The article of claim 1 wherein the ceramic corrosion resistant coating is formed on a selected portion of the component.

10. The article of claim 9 wherein the component is a turbine disk having an inner generally circular hub portion and an outer generally circular diameter, and wherein the ceramic corrosion resistant coating is applied only to the surface of the outer diameter.

11. The article of claim 1 wherein the ceramic corrosion resistant coating is formed by applying at least one layer of a gel on the metal substrate, and then heating all of the applied layers so that the gel is converted to the ceramic composition.

12. The article of claim 1 wherein the ceramic corrosion resistant coating has a total thickness of about 0.2 to about 25 micrometers.

13. The article of claim 1 wherein the ceramic corrosion resistant coating has a total thickness of about 1 to about 13 micrometers.

14. The article of claim 1 wherein the ceramic corrosion resistant coating has a strain-tolerant columnar structure throughout its thickness.

\* \* \* \* \*